United States Patent [19]

Russo

[11] 4,338,365

[45] Jul. 6, 1982

[54] BOILABLE POUCH FOR FOODS

[75] Inventor: Robert V. Russo, Brooklyn, N.Y.

[73] Assignee: Mobil Oil Corporation, New York, N.Y.

[21] Appl. No.: 221,757

[22] Filed: Dec. 31, 1980

[51] Int. Cl.$^3$ .............................................. B65D 3/28
[52] U.S. Cl. ..................................... 428/35; 428/483; 428/520; 426/127
[58] Field of Search ......................... 428/35, 483, 520; 426/113, 127, 412, 410

[56] References Cited

U.S. PATENT DOCUMENTS 3,924,031  12/1975  Kane .................................... 426/127

OTHER PUBLICATIONS

Japanese Kokai Patent Publication No. 49-5187, published Jan. 17, 1974.

Primary Examiner—George F. Lesmes
Assistant Examiner—B. K. Johnson
Attorney, Agent, or Firm—C. A. Huggett; M. G. Gilman; J. P. O'Sullivan, Sr.

[57] ABSTRACT

The present invention provides for an economical thermoplastic bag which may be employed to contain foods during storage and, most importantly, may be used to contain such foods during reheating preparatory to serving. The bag structures of the present invention comprise a two layer laminate structure, the inner bag layer, or that surface layer in contact with the foodstuffs, being formed from a thin film of polyester. The outer layer of the bag laminate, or that surface of the bag which comes into direct contact with the cooking or reheating vessel, comprises a polyacrylonitrile homopolymer. The polyacrylonitrile layer, having a melting or sticking temperature on the order of above 210° C. is stable and will not stick to the vessel side walls while foodstuffs are being reheated therein. Obviously the bag containing foodstuffs is intended to be immersed in a fluid such as water during the reheating operation. Accordingly, the present invention provides laminar bags for the storage and containment of foodstuffs which may subsequently be reheated without first removing them from the bag. In a specific embodiment of the present invention, the bag is constructed from a two-ply laminate comprising an inner film layer of polyester and an outer layer of polyacrylonitrile homopolymer film adhered thereto.

2 Claims, No Drawings

BOILABLE POUCH FOR FOODS

BACKGROUND OF THE INVENTION

1. Field of the Invention

This invention is concerned with pouches for foods that are immersed in boiling water.

2. Description of the Prior Art

In the past, polyethylene bags have been used for storage and, in particular, refrigerated food storage. Such food container bags are particularly convenient for the storage of food left-overs which may be intended for later reheating. The bulk of such food storage bags have been formed from low density, i.e., 0.91 to about 0.93 g/cc., polyethylene. For reheating purposes, foodstuffs must be removed from such low density polyethylene bags because of their tendency to partially melt and adhere to the surfaces of cooking vessels at temperatures in the order of 212° F.

To remedy this deficiency of low density polyethylene bags, attempts have been made to employ polyester bags, such as polyethylene terephthalate, for such elevated temperature applications as "boil" bags or pouches. However such films are prohibitively expensive for such disposable bag applications.

It has been known in the past that laminar film for food packaging may be formed from a laminate of nylon and polyethylene provided that an adhesive inner layer is provided between the polyethylene and the nylon. Such a construction involves a three layer structure and as such presents manufacturing difficulties. Such triple layer laminations are disclosed in the October 1978 issue of Plastics Engineering, pages 53 et seq.

SUMMARY OF THE INVENTION

The present invention provides for an economical thermoplastic bag which may be employed to contain foods during storage and, most importantly, may be used to contain such foods during reheating preparatory to serving. The bag structures of the present invention comprise a two layer laminar structure, the inner bag layer, or that surface layer in contact with the foodstuffs, being formed from a thin film of polyester. The outer layer of the bag laminate, or that surface of the bag which comes into direct contact with the cooking or reheating vessel, comprises a polyacrylonitrile homopolymer. The polyacrylonitrile layer, having a melting or sticking temperature on the order of above 210° C. is stable and will not stick to the vessel side walls while foodstuffs are being reheated therein. Obviously the bag containing foodstuffs is intended to be immersed in a fluid such as water during the reheating operation. Accordingly, the present invention provides laminar bags for the storage and containment of foodstuffs which may subsequently be reheated without first removing them from the bag. In a specific embodiment of the present invention, the bag is constructed from a two-ply laminate comprising an inner film layer of polyester and an outer layer of polyacrylonitrile homopolymer film adhered thereto.

DESCRIPTION OF SPECIFIC EMBODIMENTS

The inner ply of the boilable bag structure is polyester, such as polyethylene terephthalate, which is well known and readily available commercially. The thickness of the inner ply can vary between about 0.3 mill and about 3 mils, preferably about 0.5 mil.

The outer ply of the boilable bag structure is biaxially oriented polyacrylonitrile homopolymer film. This film and its preparation are fully described in U.S. Pat. No. 4,066,731, which is incorporated herein by reference. The thickness of the outer ply, which has low moisture permeability, can vary between about 0.3 mil and about 0.7 mil. It also is flex crack resistant.

The laminate from which the boilable bag is made can be formed by any method known to those skilled in the art. An exception is co-extrusion, since polyacrylonitrile homopolymer degrades under extruder conditions. Films can be laminated by bonding them together with a suitable adhesive or with heat and temperature. Also, laminate can be formed by extrusion coating a polyacrylonitrile homopolymer film with polyester.

A film of polyacrylonitrile homopolymer (10 by 12 inches) was placed on a stainless steel plate on the bottom platten of a laboratory press set at 600° F. The film was covered with a 10 by 12 inch film (0.48 mil) of polyethylene terephthalate and the press was closed. The two films were pressed together at 600° F. and 20,000 psi. for four minutes. Upon removal and cooling to room temperature, the two films were inseparable by mechanical means.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A boilable bag structure of a two-ply laminate comprising an inner film layer of polyester and an outer layer of biaxially oriented polyacrylonitrile homopolymer film adhered thereto.

2. A boilable bag structure of claim 1, wherein said polyester is polyethylene terephthate.

* * * * *